United States Patent
Ziemianska et al.

(10) Patent No.: US 9,641,669 B2
(45) Date of Patent: May 2, 2017

(54) AUTOMATICALLY MODIFYING A DO NOT DISTURB FUNCTION IN RESPONSE TO DEVICE MOTION

(71) Applicant: Apple Inc., Cupertino, CA (US)

(72) Inventors: Natalia Ziemianska, Cupertino, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/992,897

(22) Filed: Jan. 11, 2016

(65) Prior Publication Data

US 2016/0241706 A1    Aug. 18, 2016

Related U.S. Application Data

(62) Division of application No. 13/715,096, filed on Dec. 14, 2012, now abandoned.

(51) Int. Cl.
*H04M 3/00* (2006.01)
*H04M 1/725* (2006.01)
(Continued)

(52) U.S. Cl.
CPC ... *H04M 1/72577* (2013.01); *H04M 1/72519* (2013.01); *H04M 1/72566* (2013.01); *H04M 3/42093* (2013.01); *H04M 3/436* (2013.01); *H04W 4/20* (2013.01); *H04W 68/005* (2013.01); *H04M 1/575* (2013.01); *H04M 1/72552* (2013.01); *H04M 2250/12* (2013.01); *H04M 2250/60* (2013.01)

(58) Field of Classification Search
CPC ............ H04W 8/245; H04M 1/72525; H04M 1/72522
USPC .......................... 455/418, 456.4, 441, 422.1
See application file for complete search history.

(56) References Cited

U.S. PATENT DOCUMENTS 6,477,117 B1    11/2002   Narayanaswami et al.
6,605,038 B1    8/2003    Teller et al.
(Continued)

FOREIGN PATENT DOCUMENTS

CN    1889045    1/2007
EP    2747392    6/2014
(Continued)

OTHER PUBLICATIONS

Final Office Action mailed Sep. 3, 2015 in U.S. Appl. No. 13/714,753, 37 pages.
(Continued)

*Primary Examiner* — Nghi H Ly
(74) *Attorney, Agent, or Firm* — Kilpatrick Townsend & Stockton LLP

(57) ABSTRACT

A processor-based personal electronic device (such as a smartphone) is programmed to automatically respond to data sent by various sensors from which the user's activity may be inferred. When one or more alarms on the device are temporarily disabled or ignored, they may be automatically restored when sensor data indicates a change in the user's activity. The restoration of alarm functionality may be accompanied by a repeat of notifications missed or not responded to during a certain period prior to the sensed change in user activity.

25 Claims, 3 Drawing Sheets

Figure 1:
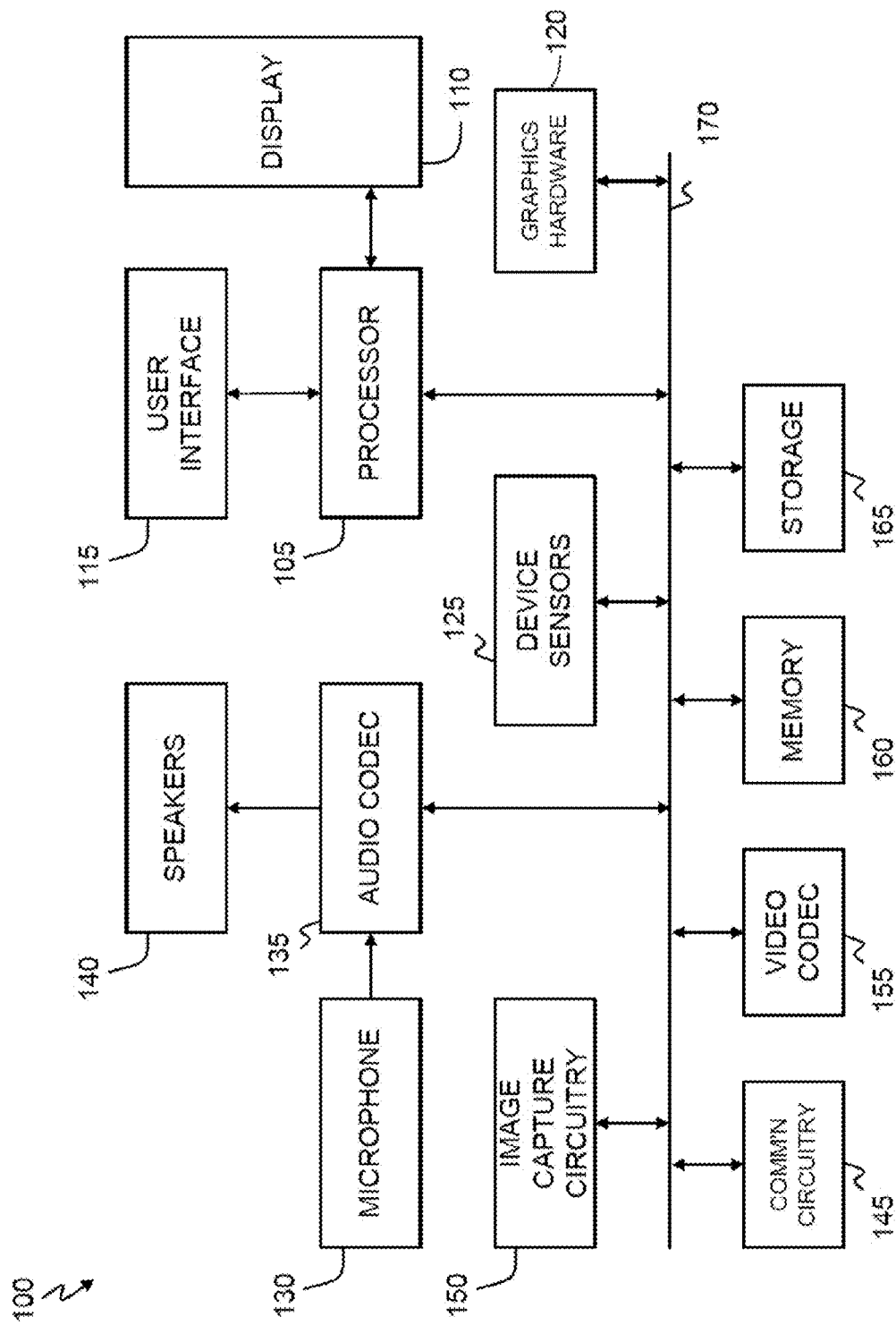

(51) Int. Cl.
   *H04M 3/436* (2006.01)
   *H04W 4/20* (2009.01)
   *H04M 3/42* (2006.01)
   *H04W 68/00* (2009.01)
   *H04M 1/57* (2006.01)

(56) References Cited

U.S. PATENT DOCUMENTS

| | | | |
|---|---|---|---|
| 7,130,664 | B1 | 10/2006 | Williams |
| 7,221,331 | B2 | 5/2007 | Bear et al. |
| 7,715,873 | B1 | 5/2010 | Biere et al. |
| 8,233,918 | B2 * | 7/2012 | Roin .............. H04W 4/02 370/352 |
| 8,299,902 | B1 | 10/2012 | Roka |
| 8,306,514 | B1 | 11/2012 | Nunally |
| 8,350,681 | B2 | 1/2013 | Bells |
| 8,483,665 | B2 | 7/2013 | Kissinger |
| 8,548,431 | B2 | 10/2013 | Teng et al. |
| 8,614,431 | B2 | 12/2013 | Huppi et al. |
| 9,049,572 | B2 | 6/2015 | Kissinger |
| 9,210,566 | B2 | 12/2015 | Ziemianska et al. |
| 2002/0004672 | A1 | 1/2002 | Florio et al. |
| 2004/0145493 | A1 | 7/2004 | O'Connor et al. |
| 2005/0172311 | A1 | 8/2005 | Hjelt et al. |
| 2007/0043687 | A1 | 2/2007 | Bodart et al. |
| 2008/0165022 | A1 | 7/2008 | Herz et al. |
| 2008/0319279 | A1 | 12/2008 | Ramsay et al. |
| 2009/0156172 | A1 | 6/2009 | Chan |
| 2009/0182560 | A1 | 7/2009 | White |
| 2009/0186633 | A1 | 7/2009 | Yonker et al. |
| 2011/0183650 | A1 | 7/2011 | McKee et al. |
| 2011/0267196 | A1 | 11/2011 | Hu et al. |
| 2012/0084248 | A1 | 4/2012 | Gavrilescu |
| 2012/0158943 | A1 | 6/2012 | Esteve Balducci et al. |
| 2012/0229276 | A1 | 9/2012 | Ronkainen |
| 2012/0323933 | A1 | 12/2012 | He et al. |
| 2013/0316744 | A1 | 11/2013 | Newham et al. |
| 2013/0324196 | A1 * | 12/2013 | Wang .............. H04W 52/0254 455/574 |
| 2014/0085077 | A1 | 3/2014 | Luna et al. |
| 2014/0101644 | A1 | 4/2014 | Lang et al. |
| 2014/0171132 | A1 | 6/2014 | Ziemianska et al. |
| 2014/0171146 | A1 | 6/2014 | Ma et al. |
| 2014/0172873 | A1 | 6/2014 | Varoglu et al. |
| 2014/0206327 | A1 | 7/2014 | Ziemianska et al. |
| 2016/0036996 | A1 * | 2/2016 | Midholt .............. G06F 1/3206 455/567 |
| 2016/0182710 | A1 * | 6/2016 | Flamini .............. H04M 3/42348 455/567 |

FOREIGN PATENT DOCUMENTS

| | | |
|---|---|---|
| GB | 2434720 | 8/2007 |
| TW | 200642421 | 12/2006 |
| WO | 2012/021507 A2 | 2/2012 |

OTHER PUBLICATIONS

Final Office Action mailed Sep. 9, 2015 in U.S. Appl. No. 13/715,096, 10 pages.
Office Action mailed Jan. 27, 2015 in U.S. Appl. No. 13/715,096, 11 pages.
"DPAC Dynamically Programmable Alarm Clock, Web Post and Video Demonstration based on an EE Capstone Competition Design Projected." Presented at Northeastern University on Apr. 8, 2010 [online—and retrieved on Oct. 27, 2014 from <URL:http://egaertner.com/dpac>. 16 pages.
Non-Final Office Action mailed on Sep. 26, 2014 for U.S. Appl. No. 13/714,753, 30 pages.
Non-Final Office Action mailed on Mar. 27, 2014 for U.S. Appl. No. 13/714,753, 21 pages.
Sam Costello: "Using Do Not Disturb on iPhone," Jun. 15, 2012 (Jun. 15, 2012), pp. 1-1, XP055108302, Retrieved from the Internet: URL:https://web.archive.org/web/20130116134725/http://ipod.about.com/od/phonefeatures/a/Using-Do-Not-Disturb-On-Iphone.htm [retrieved Mar. 17, 2014].
Non-Final Office Action mailed on May 28, 2014 for U.S. Appl. No. 13/744,547, 8 pages.
International Search Report and Written Opinion of the International Searching Authority mailed on Mar. 25, 2014 for PCT Patent Application No. PCT/US2014/010637, 10 pages.
Pina, Laura, A., et al., "Fitbit+: A behavior-based intervention system to reduce sedentary behavior," CHI 2012, May 7-12, 2012, Austin, TX, USA, 4 pages.
Office Action mailed Apr. 1, 2015 in U.S. Appl. No. 13/744,547, 9 pages.
Office Action mailed Apr. 27, 2015 in U.S. Appl. No. 13/714,753, 35 pages.
International Preliminary Report on Patentability for International PCT Application No. PCT/US2014/010637, mailed Jul. 30, 2015, 8 pages.
Final Office Action mailed Dec. 22, 2014 in U.S. Appl. No. 13/714,753, 21 pages.
Final Office Action mailed on Sep. 3, 2015 for U.S. Appl. No. 13/714,753, 37 pages.
U.S. Appl. No. 13/714,753, Advisory Action mailed on Mar. 6, 2015, 3 pages.
U.S. Appl. No. 13/715,096, Advisory Action mailed on Dec. 31, 2015, 3 pages.
U.S. Appl. No. 13/715,096, Restriction Requirement mailed on Jul. 30, 2014, 6 pages.
U.S. Appl. No. 13/744,547, Notice of Allowance mailed on Aug. 11, 2015, 5 pages.
U.S. Appl. No. 14/475,445, Non-Final Office Action mailed on Jun. 2, 2016, 9 pages.
U.S. Appl. No. 14/475,445, Restriction Requirement mailed on Jan. 22, 2016, 6 pages.
International Application No. PCT/US2015/045743, International Search Report and written opinion mailed on Oct. 29, 2015, 9 pages.
Taiwan Application No. 104128529, Office Action mailed on Jul. 11, 2016, 10 pages.

* cited by examiner

AUTOMATICALLY MODIFYING A DO NOT DISTURB FUNCTION IN RESPONSE TO DEVICE MOTION

CROSS-REFERENCES TO RELATED APPLICATIONS

This application is a divisional of U.S. application Ser. No. 13/715,096, filed Dec. 14, 2012, titled "Method and Apparatus for Automatically Repeating Alarms and Notifications in Response to Device Motion," the disclosure of which is incorporated herein by reference in its entirety.

BACKGROUND OF THE INVENTION

This invention relates to personal electronic devices. More particularly, it relates to the alarm and notification functions of smartphones.

A smartphone is a mobile phone built on a mobile operating system and having advanced computing capability and connectivity. The first smartphones combined the functions of a personal digital assistant (PDA) with a mobile phone. Later models added the functionality of portable media players, compact digital cameras, pocket video cameras, and GPS navigation units to form one multi-use device. Many current smartphones also include high-resolution touchscreens for input and web browsers that display standard web pages as well as mobile-optimized sites. High-speed data access may be provided by Wi-Fi and/or Mobile Broadband.

Wi-Fi is a widely-used technology that allows an electronic device to exchange data wirelessly (using radio waves) over a computer network, including high-speed Internet connections. The Wi-Fi Alliance defines Wi-Fi as any "wireless local area network (WLAN) products that are based on the Institute of Electrical and Electronics Engineers' (IEEE) 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or "hotspot") typically has a range of about 65 feet (20 meters) indoors and a greater range outdoors. Hotspot coverage can comprise an area as small as a single room with walls that block radio waves or as large as many square miles—this may be achieved by using multiple overlapping access points.

Mobile broadband is the term used for wireless Internet access through a portable modem, mobile phone, USB wireless modem, or other mobile devices. A smartphone is basically a cellular telephone with built-in applications and Internet access. In addition to digital voice service, current smartphones provide text messaging, e-mail, Web browsing, and video playback and calling. In addition to their built-in functions, smartphones can run myriad free and paid applications, turning the cellphone into a mobile personal computer.

In addition to radio transmitters and receivers for interacting with cellular telecommunications systems, many smartphones have additional sensors that provide input to their various systems. For example, Apple Inc.'s iPhone® 5 smartphone includes at three-axis gyro, an accelerometer, a proximity sensor and an ambient light sensor.

The iPhone display may respond to a number of sensors. A proximity sensor deactivates the display and touchscreen when the device is brought near the face during a call. This is done to save battery power and to prevent inadvertent inputs from contact with the user's face and ears. An ambient light sensor adjusts the display brightness which in turn saves battery power. A 3-axis accelerometer senses the orientation of the phone and changes the screen accordingly, allowing the user to easily switch between portrait and landscape mode. Photo browsing, web browsing, and music playing support both upright and left or right widescreen orientations.

Certain smartphones have a "do not disturb" mode. When the "do not disturb" mode is activated (e.g., via a Settings menu), the phone suppresses most forms of communication—phone calls, text messages, alarms, social media notifications, and the like. When this mode is enabled, the phone will not light up or vibrate at all, so the user can get through a meeting or go to bed without being disturbed by the outside world. However, all of those notifications may get captured and appear in a "Notification Center" when the phone's display is turned on by the user.

The user may configure the "Do not disturb" feature to function on a predefined schedule, or may simply turn it on and off as needed. The user may also specify certain contacts—sometime designated as "VIPs"—who are allowed to get through to the user even if the phone is in "do not disturb" mode.

In certain implementations, when a call comes in, the user can choose to answer or ignore it, as usual, or may immediately reply with a text message. The user may also set the smartphone to remind him or her about the call later—either at a specific time, or when leaving the current location (as determined from the phone's location sensors).

Various options may allow the Do Not Disturb settings on a smartphone to be further customized. For example, an option for "Repeated Calls" may allow activation of a mode wherein whenever someone calls back a second time from the same number within a certain time interval, the second call will not be silenced.

BRIEF SUMMARY OF THE INVENTION

A processor-based personal electronic device (such as a smartphone) is programmed to automatically respond to data sent by various sensors from which the user's activity may be inferred. One or more of the sensors may be worn by the user and remote from the device. A wireless communication link may be used by the device to obtain remote sensor data. In certain embodiments, data from on-board sensors in the device—such as motion sensors, location sensors, ambient light sensors, and the like—may also be used to deduce the user's current activity.

Various embodiments allow a processor-based personal electronic device (such as a smartphone) to dynamically institute or cancel notifications (e.g., reminders and alarms) based on device motion. One exemplary use scenario is when a number of messages (e-mail, SMS, phone, or the like) are received during the time a user is away from their phone (inferred from a sensed lack of motion by the smartphone). When the smartphone is picked-up (as may be inferred from sensor data), reminders may be generated so that the user will see all the notification activity during the time they were away from the device.

In certain embodiments, a change in motion state of a device triggers certain actions by the device. By way of example, a first motion state wherein the device rhythmically moves up and down in small displacements (such as might be sensed by a device stored in the pocket or purse of a user who is walking) may change to a second motion state wherein the device is picked up by a user and moved in a substantially single motion of greater displacement. The change of state from first motion state to second motion state may be used to automatically retrigger unacknowledged notifications generated during the period of time the device was in the first motion state.

BRIEF DESCRIPTION OF THE SEVERAL VIEWS OF THE DRAWING(S)

Figure 2A:
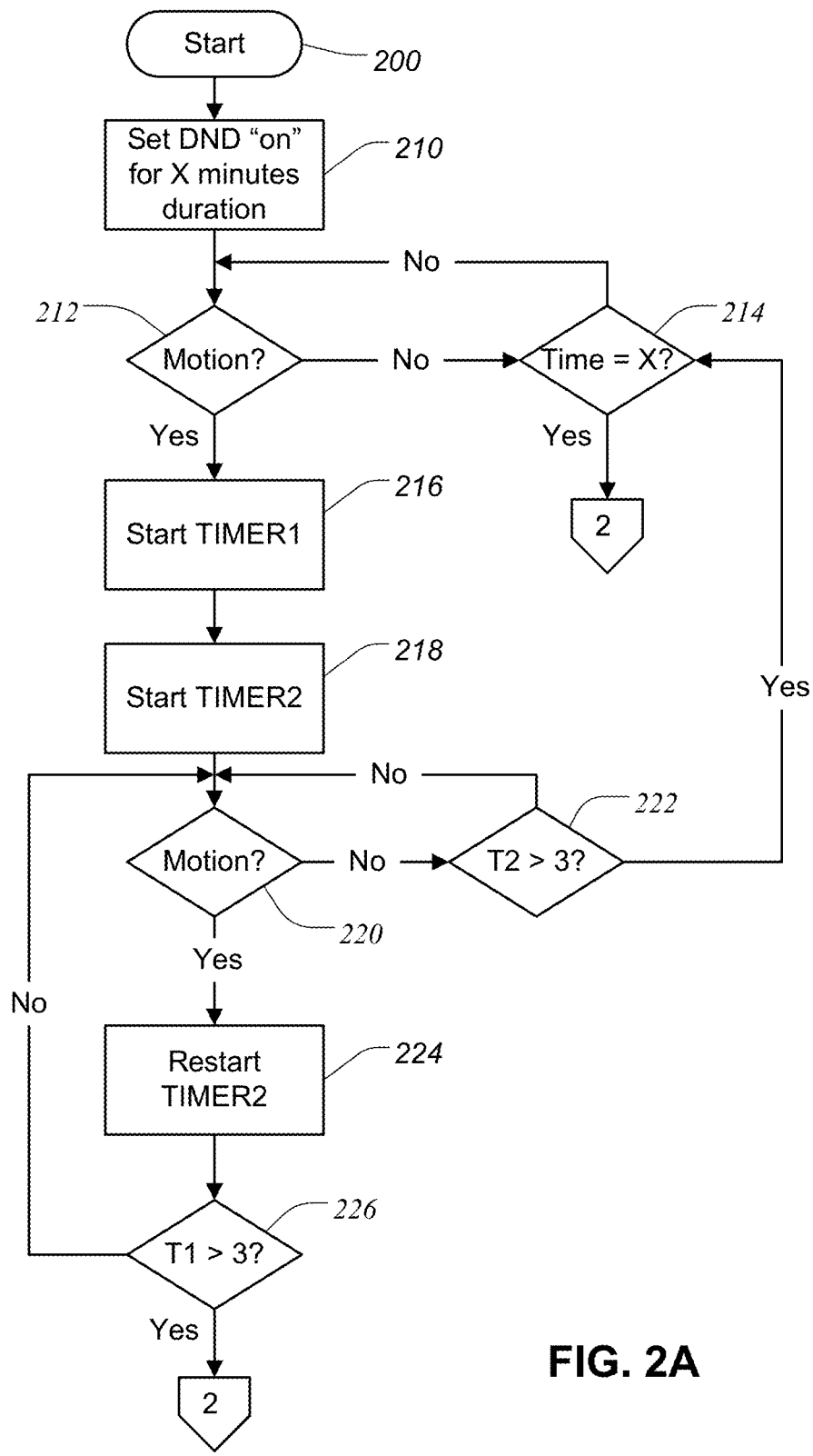
Figure 2B:
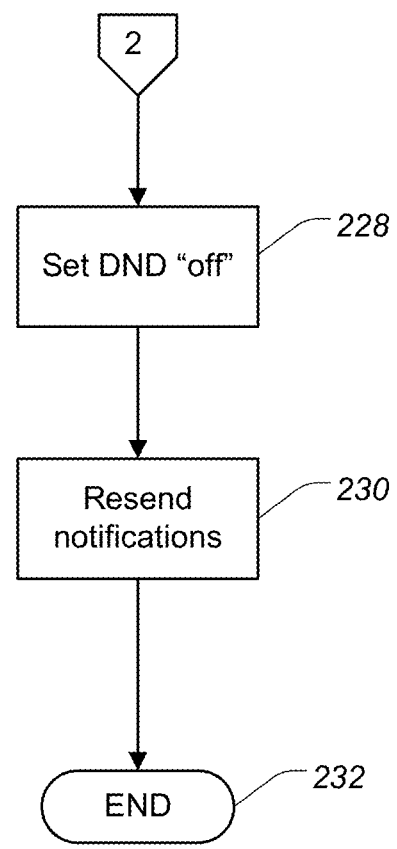

FIG. 1 is a block diagram of a processor-based device
FIGS. 2A and 2B are a flowchart of a process according to one embodiment of the invention.

DETAILED DESCRIPTION OF THE INVENTION

Referring to FIG. 1, a simplified functional block diagram of illustrative electronic device 100 is shown according to one embodiment. Electronic device 100 could, for example, be a smartphone, personal media device, portable camera, or a tablet, notebook or desktop computer system. As shown, electronic device 100 may include processor 105, display 110, user interface 115, graphics hardware 120, device sensors 125 (e.g., proximity sensor/ambient light sensor, accelerometer and/or gyroscope), microphone 130, audio codec(s) 135, speaker(s) 140, communications circuitry 145, image capture circuit or unit 150, video codec(s) 155, memory 160, storage 165, and communications bus 170.

Processor 105 may execute instructions necessary to carry out or control the operation of many functions performed by device 100 (e.g., such as the processing of data obtained from device sensors 125). Processor 105 may, for instance, drive display 110 and receive user input from user interface 115. User interface 115 can take a variety of forms, such as a button, keypad, dial, a click wheel, keyboard, display screen and/or a touch screen. Processor 105 may be a system-on-chip such as those found in mobile devices and include one or more dedicated graphics processing units (GPUs). Processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 perform computational tasks. In one embodiment, graphics hardware 120 may include one or more programmable graphics processing units (GPUs).

Image capture circuitry 150 may capture still and video images that may be processed to generate images. Output from image capture circuitry 150 may be processed, at least in part, by video codec(s) 155 and/or processor 105 and/or graphics hardware 120, and/or a dedicated image processing unit incorporated within circuitry 150. Images so captured may be stored in memory 160 and/or storage 165. Memory 160 may include one or more different types of media used by processor 105, graphics hardware 120, and image capture circuitry 150 to perform device functions. For example, memory 160 may include memory cache, read-only memory (ROM), and/or random access memory (RAM). Storage 165 may store media (e.g., audio, image and video files), computer program instructions or software, preference information, device profile information, and any other suitable data. Storage 165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 160 and storage 165 may be used to retain computer program instructions or code organized into one or more modules and written in any desired computer programming language. When executed by, for example, processor 105 such computer program code may implement one or more of the methods described herein.

An electronic device such as device 100 may receive inputs from on-board device sensors 125 which sensors may be of the types described, above—i.e., proximity sensors, accelerometers, gyroscopes, ambient light sensors and location sensors. In addition, it may receive signals and/or data from remote sensors via communication circuitry 145. Such remote sensors may be worn by the user of the device—e.g., wrist motion sensors, pulse rate sensors, breathing rate sensors, and the like. It will be appreciated by those skilled in the art that processor 105 of system 100 may be programmed to receive input data from the sensors and deduce from that data the current activity of the user. The activity of the user may be used to automatically select one or more states (or "settings") of the device.

Example 1

Referring now to FIGS. 2A and 2B, a process according to one particular embodiment is shown in the form of a flowchart wherein a user of device 100 (which may be a smartphone) activates the Do Not Disturb function (or state) of the device prior to taking a 45-minute nap.

The process may begin at 200 (see FIG. 2A) with the device displaying a Do Not Disturb (DND) activation dialog box requesting a desired duration of the DND state. At process box 210, the user selects the DND state "on" for a duration of X minutes (X=45 in this example). The device enters the DND state by suppressing alarms and notifications which would otherwise activate during the 45-minute period and starts a 45-minute timer. The alarms and/or notifications may be audible and/or tactile. At diamond 212, the device monitors its built-in motion sensors to determine whether it is motionless (as might be expected if it were placed on a nightstand, headboard, bedside table or the like near a sleeping user). If no motion is detected ("No" branch at 212), the device checks the DND period timer at 214 to determine whether the DND duration set by the user has been reached. If the duration period has concluded ("Yes" branch at 214), the process continues to box 228 (see FIG. 2B) at which point the DND state is deselected and, any notifications received during the DND period are resent (at 230) to alert the user of the suppressed notifications. The process may then conclude at 232 with a reversion to the normal state of the device.

By way of example, consider a situation wherein a user sets the DND state for a 45-minute nap, but awakens after sleeping for 30 minutes and picks up device 100 (e.g., his or her smartphone) from a bedside table to determine the time of day from the built-in clock function of device 100. In this scenario, motion of the device would be detected at diamond 212 whereupon a first timer ("TIMER1") would be automatically started (at 216) and a second timer ("TIMER2") would also be automatically started (at 218). The purpose of TIMER1 and TIMER2 is to determine the duration of the detected motion. In this example, the user is merely checking the time of day and may return the device to its resting position on the bedside table after realizing that he or she may go back to sleep for an additional 15 minutes. In such a case, the period of motion may be expected to be relatively short. By way of example only, the illustrated process uses a 3-minute period to determine whether the device is being actively used by the user or has merely been (briefly) checked by the user.

After initially detecting motion (at 212) and starting TIMER1 and TIMER2 the device again checks for motion at 220. If no additional (or continuing) motion is detected ("No" branch) at 220, a determination is made a 222 whether TIMER2 has reached the 3-minute mark. If not (T2<3; "No" branch at 222), the device returns to monitoring for motion at 220). If, on the other hand, TIMER2 exceeds 3 minutes— i.e., the device has not been further moved for 3 minutes— ("Yes" branch at 222), the process may return to decision diamond 214 for a determination of whether the DND period has expired. If not ("No" branch at 214) the process repeats. If the DND period is up ("Yes" branch) at 214, the process continues to box 228 (see FIG. 2B) at which point the DND state is deselected and, any notifications received during the DND period are resent (at 230) to alert the user of the suppressed notifications. The process may then conclude at 232 with a reversion to the normal state of the device.

In another scenario, the user awakens after sleeping for 30 minutes and picks up his or her device from the bedside table and begins actively using the device—i.e., does not return the device to its resting place on the bedside table but continues to hold and manipulate the device. In this case, the additional (or continuing) motion of the device may be detected ("Yes" branch at 220) which leads, at process box 224, to a restart of TIMER2—i.e., TIMER2 is reset to zero. At 226, the device may determine whether TIMER1 has reached the 3-minute mark. If not (T1<3; "No" branch at 226), the process returns to monitoring for additional motion at 220. If, however, the device has been in motion for more than 3 minutes—i.e., is being actively used—TIMER1 will exceed 3 minutes ("Yes" branch at 226) and the process may continue to box 228 (see FIG. 2B) at which point the DND state is automatically deselected and, any notifications received during the DND period are automatically resent (at 230) to alert the user of any suppressed notifications. The process may then conclude at 232 with a reversion to the normal state of the device.

The above-described process permits a user to briefly pick up his or her smartphone to check the time of day (or other indications) without triggering notifications. However, more prolonged use of the device automatically returns it to an active state (DND off) and triggers notifications.

In yet other embodiments, the device may (additionally) monitor for user inputs to detect active use of the device, and, in response, automatically deselect the DND state or remind the user that the DND state is active and present the user with the option of deselecting the DND state.

Example 2

In certain embodiments, a device may use data from on-board motion sensors to detect that it has been stationary for a period of time and re-trigger notifications sent during that period when the motion sensors detect motion—such as a user picking up the device.

In this way, a user might put down his or her smartphone on a dresser and take a lengthy shower or bath. During this time, one or more messages, e-mails, and other electronic messaging and wireless digital messaging services with attendant notifications (audible and/or tactile) are received (and may be repeated). However, the user does not hear the notifications (or repeats). The user then gets dressed quickly and puts the smartphone in his or her pocket without realizing that message notifications were missed. By using one or more built-in motion sensors, the device may re-trigger the notifications first made during the period of inactivity when the user picks up the device.

Example 3

As discussed above, sensor data (motion, orientation, acceleration, and the like) may be used by a processor-based device to infer the activity of the user. A change in activity may be used as a criterion for re-triggering notifications and reminders.

An exemplary scenario for such an embodiment may be a message received while the device is in a motion corresponding to walking—e.g., in a purse or backpack. When the device is later lifted by the user (a detectably different motion than walking), reminders and notifications announced during the walking period may automatically be regenerated and announced (sounded, displayed or the like). In certain embodiments, repeated notifications may be limited to unacknowledged notifications.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A method for operating a mobile device, the method comprising:
   entering, by the mobile device, a do not disturb state, wherein the mobile device, while in the do not disturb state, suppresses audible or tactile notifications of incoming communications; and
   after entering the do not disturb state:
   detecting, by the mobile device, a motion of the mobile device;
   determining, by the mobile device, based at least in part on the detected motion, whether to exit the do not disturb state or wait;
   in response to determining, based at least in part on the detected motion, to exit the do not disturb state, exiting, by the mobile device, the do not disturb state such that receiving a communication from another device causes an audible or tactile notification to be presented; and
   in response to determining to wait; remaining, by the mobile device, in the do not disturb state such that receiving a communication from another device does not cause an audible or tactile notification to be presented.

2. The method of claim 1 further comprising:
   receiving, by the mobile device, a user input indicating that the mobile device should enter the do not disturb state,
   wherein entering the do not disturb state occurs in response to the user input.

3. The method of claim 1 wherein the mobile device enters the do not disturb state based on a schedule provided to the mobile device by the user.

4. The method of claim 1 further comprising:
   establishing, by the mobile device, an end time for the do not disturb state; and in the event that the mobile device remains in the do not disturb state until the end time, automatically exiting the do not disturb state at the end time.

5. The method of claim 4 wherein establishing the end time for the do not disturb state includes:
prompting, by the mobile device, the user to specify the end time for the do not disturb state.

6. The method of claim 4 wherein the end time for the do not disturb state is established based on a schedule provided to the mobile device by the user.

7. The method of claim 1 wherein determining, based at least in part on the detected motion, whether to exit the do not disturb state or wait includes:
determining a duration of the detected motion;
in the event that the duration of the detected motion does not exceed a threshold duration, determining to wait; and
in the event that the duration of the detected motion exceeds the threshold duration, determining to exit the do not disturb state.

8. The method of claim 7 wherein the threshold duration is selected to distinguish an instance of the user checking a time displayed on the mobile device and returning the device to a resting place from an instance of the user continuing to hold and manipulate the device.

9. The method of claim 1 wherein determining, based at least in part on the detected motion, whether to exit the do not disturb state or wait includes:
determining a duration of the detected motion;
in the event that the duration of the detected motion does not exceed a threshold duration, determining to wait; and
in the event that the duration of the detected motion exceeds the threshold duration, prompting the user to indicate whether to exit the do not disturb state or wait.

10. The method of claim 1 wherein determining, based at least in part on the detected motion, whether to exit the do not disturb state or wait further includes:
responsive to detecting the motion of the mobile device, monitoring for user inputs to the device;
determining, based on the monitoring for user inputs, whether the user is engaged in active use of the device;
in the event that the user is not engaged in active use of the device, determining to wait; and
in the event that the user is engaged in active use of the device, determining to exit the do not disturb state.

11. The method of claim 1 wherein determining, based at least in part on the detected motion, whether to exit the do not disturb state or wait further includes:
responsive to detecting the motion of the mobile device, monitoring for user inputs to the device;
determining, based on the monitoring for user inputs, whether the user is engaged in active use of the device;
in the event that the user is not engaged in active use of the device, determining to wait; and
in the event that the user is engaged in active use of the device, prompting the user to indicate whether to exit the do not disturb state or wait.

12. The method of claim 1 further comprising:
after exiting the do not disturb state, automatically presenting an alert to the user of at least one notification that was suppressed while the mobile device was in the do not disturb state.

13. A mobile device comprising:
a user interface;
a motion sensor;
communication circuitry operable to send and receive electronic communications via a network; and
a processor coupled to the user interface, the motion sensor, and the communication circuitry, the processor configured to:
place the mobile device in a do not disturb state, wherein the mobile device, while in the do not disturb state, suppresses notifications of incoming communications; and
after entering the do not disturb state:
detect, based on a signal from the motion sensor, a motion of the mobile device;
determine, based at least in part on the detected motion, whether to exit the do not disturb state or wait;
in response to determining, based at least in part on the detected motion, to exit the do not disturb state, exit the do not disturb state such that receiving a communication from another device causes an audible or tactile notification to be presented; and
in response to determining, based at least in part on the detected motion, to wait; remain in the do not disturb state such that receiving a communication from another device does not cause an audible or tactile notification to be presented.

14. The mobile device of claim 13 wherein the motion sensor includes at least one of an accelerometer, a gyroscope, a proximity sensor, or a location sensor.

15. The mobile device of claim 13 wherein the processor is further configured to:
establish an end time for the do not disturb state; and
in the event that the mobile device remains in the do not disturb state until the end time, automatically exit the do not disturb state at the end time.

16. The mobile device of claim 13 wherein the processor is further configured to, after exiting the do not disturb state, automatically present an alert to the user of any notifications that were suppressed while the mobile device was in the do not disturb state.

17. A non-transitory computer-readable storage medium having stored thereon program code instructions that, when executed by a processor of the mobile device, cause the mobile device to perform a method comprising:
entering a do not disturb state, wherein the mobile device, while in the do not disturb state, suppresses notifications of incoming communications;
after entering the do not disturb state:
detecting a motion of the mobile device;
determining based at least in part on the detected motion, whether to exit the do not disturb state or wait;
in response to determining, based at least in part on the detected motion, to exit the do not disturb state, exiting the do not disturb state such that receiving a communication from another device causes an audible or tactile notification to be presented; and
in response to determining, based at least in part on the detected motion, to wait; remaining in the do not disturb state such that receiving a communication from another device does not cause an audible or tactile notification to be presented.

18. The non-transitory computer-readable storage medium of claim 17 wherein the method further comprises:
receiving a user input indicating that the mobile device should enter the do not disturb state, wherein entering the do not disturb state occurs in response to the user input.

19. The non-transitory computer-readable storage medium of claim 17 wherein the method further comprises:
establishing an end time for the do not disturb state; and
in the event that the mobile device remains in the do not disturb state until the end time, automatically exiting the do not disturb state at the end time.

20. The non-transitory computer-readable storage medium of claim 19 wherein establishing the end time for the do not disturb state includes:
prompting, by the mobile device, the user to specify the end time for the do not disturb state.

21. The non-transitory computer-readable storage medium of claim 19 wherein the mobile device enters the do not disturb state based on a schedule provided to the mobile device by the user and wherein the end time for the do not disturb state is established based on the schedule provided to the mobile device by the user.

22. The non-transitory computer-readable storage medium of claim 17 wherein determining, based at least in part on the detected motion, whether to exit the do not disturb state or wait is based at least in part on a duration of the detected motion.

23. The non-transitory computer-readable storage medium of claim 17 wherein determining, based at least in part on the detected motion, whether to exit the do not disturb state or wait is based in part on the detected motion and in part on whether the mobile device receives user inputs indicating that the user is engaged in active use of the device.

24. The non-transitory computer-readable storage medium of claim 17 wherein determining, based at least in part on the detected motion, whether to exit the do not disturb state or wait is further based in part on a user response to a prompt to exit the do not disturb state.

25. The non-transitory computer-readable storage medium of claim 17 wherein the method further comprises:
after exiting the do not disturb state, automatically presenting an alert to the user of any notifications that were suppressed while the mobile device was in the do not disturb state.

* * * * *